Figure 1:
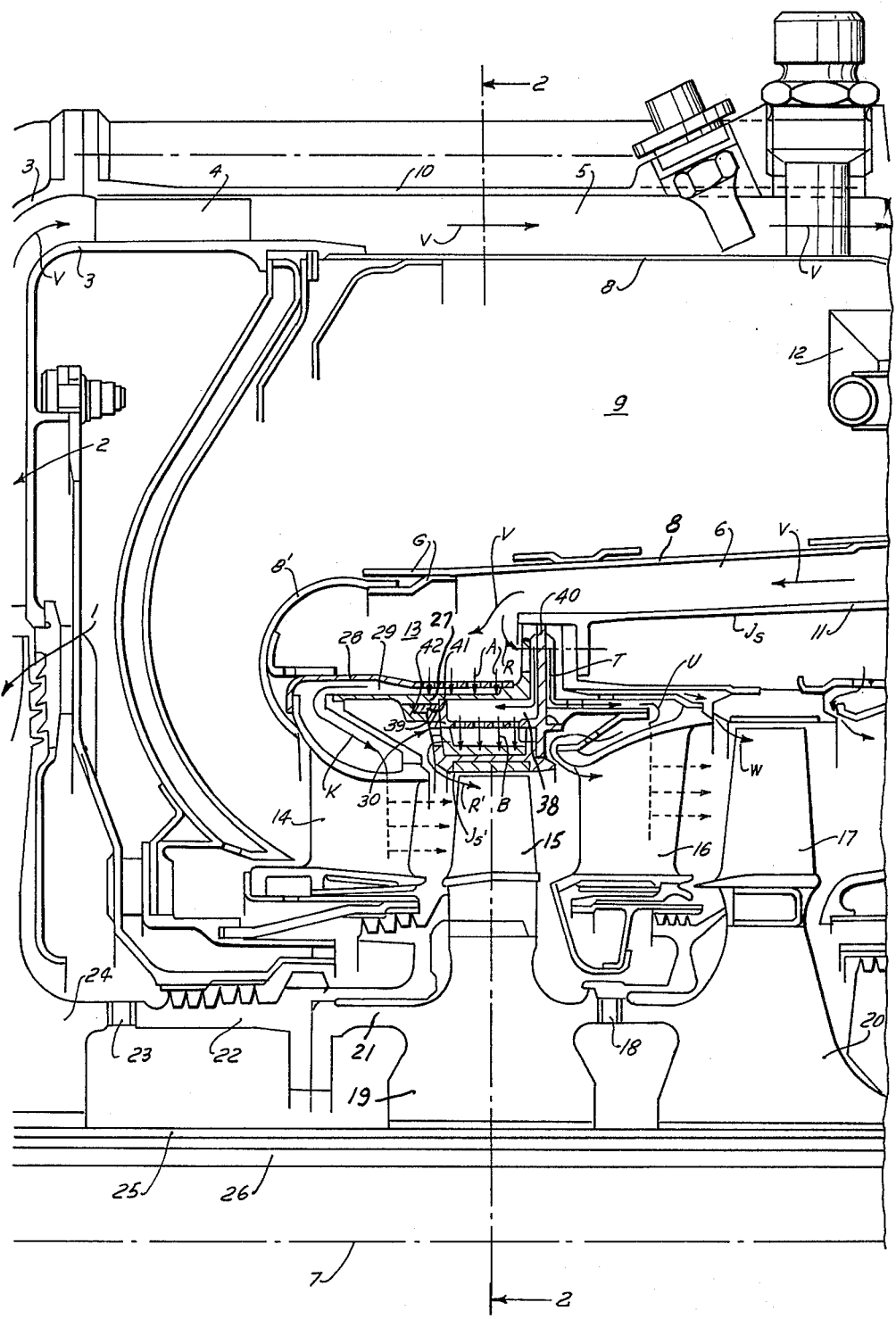

United States Patent [19]

Weiler et al.

[11] 4,439,981

[45] Apr. 3, 1984

[54] ARRANGEMENT FOR MAINTAINING CLEARANCES BETWEEN A TURBINE ROTOR AND CASING

[75] Inventors: Wolfgang Weiler; Klaus Trappmann, both of Dachau, Fed. Rep. of Germany

[73] Assignee: MTU Motoren-Und Turbinen-Union Munchen GmbH, Munich, Fed. Rep. of Germany

[21] Appl. No.: 393,919

[22] Filed: Jun. 30, 1982

Related U.S. Application Data

[63] Continuation of Ser. No. 122,086, Feb. 19, 1980, abandoned.

[30] Foreign Application Priority Data

Feb. 28, 1979 [DE] Fed. Rep. of Germany ....... 2907749

[51] Int. Cl.³ .................. F02C 7/18; F01D 11/08; F01D 25/12
[52] U.S. Cl. ................... 60/39.32; 60/39.36; 415/117; 415/136; 415/139
[58] Field of Search ............... 415/116, 117, 134, 136, 415/138, 139; 60/39.32, 39.36

Primary Examiner—Douglas Hart
Attorney, Agent, or Firm—Alan H. Levine

[57] ABSTRACT

An annular sleeve surrounds a turbine rotor and is fixed with respect to the turbine casing, the sleeve being elastically deformable in a radial direction. A wear ring is carried by the sleeve, the wear ring being composed of segments arranged end-to-end circumferentially. The adjacent ends of the segments are spaced apart when the turbine is cold or idling. The thermal expansions of the turbine rotor and of the sleeve and ring are so related that in one operating temperature range of the turbine the spaces between the adjacent ends of the ring segments close and the segment ends engage each other, and in a higher operating temperature range of the turbine the sleeve expands. Air leaving the compressor is directed against the sleeve and the stationary part carrying the sleeve. The wear ring and portion carrying the sleeve may be insulated. The sleeve may be mounted on a combustion chamber surrounding the turbine.

1 Claim, 2 Drawing Figures

ARRANGEMENT FOR MAINTAINING CLEARANCES BETWEEN A TURBINE ROTOR AND CASING

This application is a continuation of application Ser. No. 122,086, filed Feb. 19, 1980 now abandoned.

This invention relates to means for minimizing and maintaining the clearance prevailing in an axial-flow turbine between the free outer turbine rotor blade tips, or an outer shroud of the turbine rotor blades, and an adjacent turbine casing, especially in a gas turbine engine.

Small output gas turbine engines, of both turboshaft and turbojet construction, are often provided with a reverse-flow annular combustion chamber and an axial-flow turbine. The highly efficient operating cycles sought, with their high specific outputs or high specific thrusts at moderate fuel consumptions, also dictate that the turbine driving the compressor be of small size. Therefore, the radial clearance between the bladed rotor wheel and the casing significantly affects the output, or the thrust, and the efficiency. If such gas turbine engines are additionally subjected to frequent abrupt changes in load conditions, it will be necessary to minimize the blade tip clearances, not only at steady-state operating conditions, but also at transient operating conditions when the transition is made from one output level to another. What aggravates the situation with engines of this type is the fact that as a result of the design concept of the compressor turbine, with its relatively low hub ratio in conjunction with a normally high ratio of the hub bore diameter to the rim diameter of the rotor disc, the amount of thermal expansion of the rotor blades is often more than one third of the total expansion of the rotor. Considering, however, that the thermal expansion of the rotor blades, much like the thermal expansion of the nozzle vanes and the casing, will rapidly follow the variations in working gas temperature, while the thermal expansion of the rotor disc clearly lags behind, it follows that state-of-the-art constructions designed to minimize blade tip clearances and keep them constant, such as a nozzle guide vane support arrangement, are not entirely satisfactory.

It is a broad object of the present invention to provide means for minimizing and maintaining the blade tip clearances in axial-flow turbines for turbomachines, especially for gas turbine engines, over a maximally wide operating range, and also in the presence of transient operating conditions.

The advantages and principles of operation of the present invention are described below.

When cold and at idle conditions, the segmented wear ring exhibits a certain clearance circumferentially between its various segments. A certain radial clearance likewise exists between the blade tips and the wear ring. At rising engine output (where the rate of change in output is for the present considered small enough to ignore), the turbine casing or nozzle guide vane support and an elastic sleeve suspended from it will grow radially largely as a function of the compressor exit temperature, while the ring segments will grow circumferentially largely as a function of turbine entry temperature. Until a certain part-load point is reached, the diameter of the wear ring is a measure of the thermal expansion of the turbine casing or the nozzle guide vane support. This part-load point is selected to suit the application, and it is reached when the circumferential clearance has diminished to zero. As the engine output keeps increasing beyond this point, the segmented ring acts as a closed ring; its thermal expansion, which exceeds that of the turbine casing or the nozzle guide vane support, and which exceeds that of the elastic sleeve of largely the same temperature, causes elastic expansion of the latter component in the plane of suspension of the segmented wear ring.

When the output of the engine is brought down the thermal expansion profile of the segmented wear ring is reversed analogously.

At abrupt load variations, e.g., when accelerating from a low output level to a higher level, the segments of the wear ring, as well as the turbine rotor blades, very rapidly follow the temperature associated with the new steady-state operating condition. They first expand circumferentially until the clearance between the various segments circumferentially has been reduced to zero. Until that point the diameter of the segmented wear ring is a function of the thermal expansion of the elastic sleeve in the segment suspension area, which is supplied with air from the compressor exit. Since the compressor exit temperature will spontaneously follow the new load point of the engine, the thermal expansion of the sleeve takes place at a relatively small time constant, i.e., about as rapidly as the thermal expansion of the rotor blades. Then, as the segmented wear ring keeps heating up, its action becomes that of a closed ring and its thermal expansion now causes the elastic sleeve to expand elastically. The turbine casing, or the vane support, heats up, under the influence perhaps of thermal insulation measures, and accordingly expands with a certain delay corresponding to that with which the rotor disc heats up after the rotor blades, and this is accompanied by a partial or perhaps full reversal of the elastic deformation of the elastic sleeve. In the latter case, circumferential clearance between the wear ring segments will again occur. Providing the elastic sleeve with air from the compressor exit will additionally make it possible to limit the compressive forces acting circumferentially at the abutment points of the segments.

When the load is reduced abruptly from a higher to a lower setting the various processes will be reversed: the temperature of the segments of the wear ring first follow, at approximately the same time constant as the rotor blades, the temperature corresponding to the new operating condition, which causes them to shrink. As long as the elastic sleeve is still deformed, its deformation is being reversed. As a consequence the diameter of the segmented wear ring will be reduced at approximately the time constant of the rotor blades. Then, when the point is reached at which circumferential clearance occurs between the various segments, the cooling of the elastic sleeve with air from the compressor exit causes shrinkage in the segment suspension area, which in turn reduces the diameter of the segmented wear ring at a small time constant, i.e., about as rapidly as the shrinkage of the rotor blades.

This turbine stator arrangement ensures that the gas turbine engine involved can be operated with small blade tip clearances being maintained over a wide operating range and also at transient operating conditions, which automatically benefits the performance and the efficiency of the engine.

Figure 2:
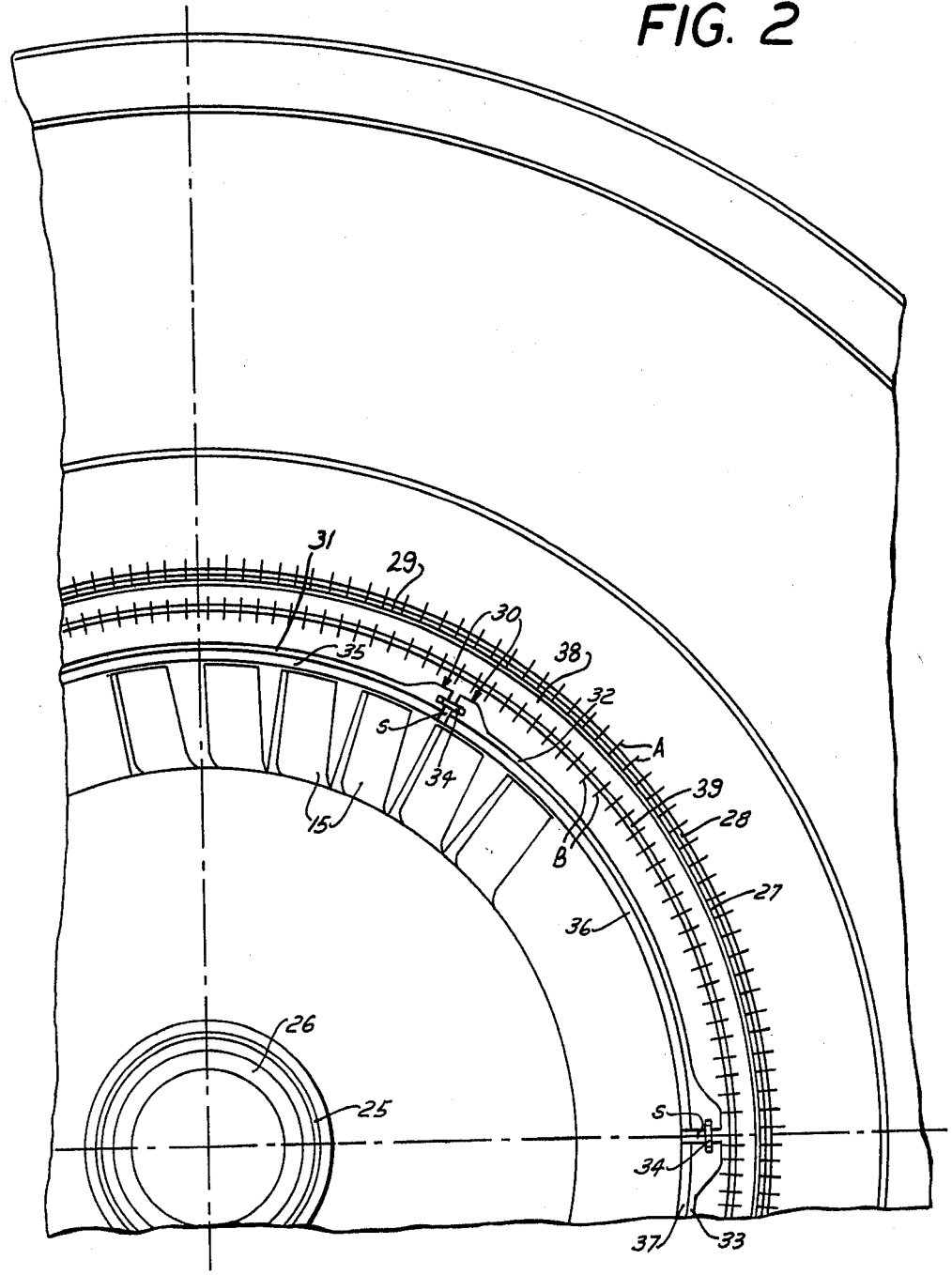

The invention is further described below with reference to the accompanying drawings, in which:

FIG. 1 is a fragmentary longitudinal cross-sectional view illustrating a gas turbine engine equipped with essential components according to the present invention; and FIG. 2 is a transverse cross-sectional view taken along line 2—2 of FIG. 1.

The gas generator of the engine of FIG. 1 comprises a centrifugal compressor 1 followed by a radial-flow diffusor 2 from which the flow V exiting from the compressor is deflected axially through an approximately 90-degree bend 3 to be ducted to an axial-flow cascade 4 behind the bend 3. From the axial-flow cascade 4, the compressor air V reaches a first annular duct 5 and, after flowing around the combustion chamber head, then reaches a second annular duct 6, both ducts being arranged coaxially to the longitudinal centerline 7 of the engine. The first and second ducts 5 and 6 are formed by the flame tube walls 8 of an annular, reverse flow combustion chamber 9 arranged coaxially to the longitudinal centerline 7, on the one hand, and by an outer casing wall 10 and a nozzle guide vane support 11 formed in continuation of and connected to said casing wall 10, on the other.

The vaulted rear wall of the flame tube, which is omitted on the drawing, is surrounded at a distance by the casing wall 10, which extends parallel to it. A portion of the incoming compressor air V is admitted to the combustion process through several, circumferentially equally spaced vaporizer tubes, exemplified by vaporizer tube 12, which are connected to the rear wall of the flame tube.

From the annular duct 6, the compressor air V flows into an annular duct 13 which connects directly to the duct 6 and which is radially expanded relative to the flame tube walls 8. From here it is routed to serve various cooling functions in a manner described more fully elsewhere herein.

The gas generator of the engine further comprises a two-stage turbine to drive the compressor, its nozzle guide vanes and rotor blades being indicated serially from left to right by the numerals 14, 15 and 16, 17, respectively. The two-stage compressor turbine also comprises two turbine rotor discs 19, 20 rotationally rigidly connected together by, among other means, circumferentially arranged teeth 18. The turbine rotor disc 19 is coupled to the disc 24 of the centrifugal compressor 1 through further rotor components 21, 22 and circumferentially arranged teeth 23.

In FIG. 1, the numeral 25 indicates a tie rod, taking the shape of a tubular shaft, for the gas generator groups. A tubular shaft 26 is accommodated within this tie rod to transfer the output of a power turbine, arranged mechanically independently downstream of the compressor turbine, to a gearbox arranged on the forward axle of the engine.

With further reference to FIG. 1, an annular sleeve-shaped component 27, capable of radially elastic deformation, is suspended from the nozzle guide vane support 11. The sleeve 27 is supplied with air V taken from the compressor exit and directed, from annular duct 13 and a perforated sleeve 28, against the sleeve 27 in the form of high-energy air jets A (impingement cooling). The perforated sleeve 28 is connected to the sleeve 27 and also to a deflector bend 8', and it cooperates with the sleeve 27 to support the turbine inlet vanes 14. The deflector bend 8' is loosely suspended at its upstream end in a forked section G of the flame tube wall 8. The elements 8', 14, 27 and 28 form a structural unit. From the annulus 29, enclosed by the perforated sleeve 28 and the sleeve 27, a portion of the incoming compressor air is ducted as cooling air (arrowhead K) into the hollow vane 14 to be returned to the gas stream after having done its cooling work.

Attached to the sleeve 27 is a wear ring 30 divided into segments 31, 32, 33 (FIG. 2) which when cold and at idle conditions are arranged with a certain amount of circumferential clearance S between adjacent abutting edges. The various segments 31, 32, 33 of the wear ring 30 are circumferentially sealed one with the other by means of connecting plates 34. Once a certain operating range is exceeded, the circumferential clearance S becomes zero, and should the temperature keep rising, elastic deformation of the sleeve 27 will result.

With reference now to FIG. 2, the wear ring is segmented in suitably selected sequence and provided with wearaway liners 35, 36, 37.

With reference again to FIG. 1, the segmented wear ring 30 is given impingement cooling (arrowheads B) by using a remaining portion of the air taken from the compressor exit, the air flowing into an annulus 38 from the annular duct 13 in the direction of arrow R. This annulus 38 is formed between a further perforated sleeve 39, the sleeve 27, and a support ring 40 attached to the nozzle vane support 11. Support ring 40 supports the rear end of the wear ring 30 and the turbine nozzle vanes 16. Also supported by support ring 40 is the rear end of the perforated sleeve 39. A residual air stream R' issuing from the annular duct formed between the wear ring 30 and the perforated sleeve 39 serves a sealing air function and also provides film cooling along that surface of the wear ring 30 which faces the blade tips. Another air portion T, diverted from the annular duct 13, breaks down into a cooling air stream U, for the vanes 16, and into a further sealing or film cooling air stream W, for the second stage of the turbine.

As is apparent from FIG. 1, the segmented wear ring 30 is suspended from its end 41 projecting axially from collar-shaped step 42 of the sleeve 27.

A further feature of the present invention is that the frontal areas of the segmented wear ring 30 (shown cross-hatched in FIG. 1), and its immediate suspension means (ends 41) on the elastic sleeve 27, are sized such that the heating profile will be related to the thermal expansion of the turbine rotor disc 19 so as to ensure thermally elastic expansion of the sleeve 27.

With reference now to FIG. 1, the turbine nozzle vane support 11 is supplied and cooled with air V taken from the compressor exit, with a layer Js of thermal insulation arranged for best results on that side of the vane support 11 which faces away from the stream of compressor air V. The segmented wear ring 30 can likewise be furnished with a thermal insulation layer Js' on the surface facing the rotor blade tips. The thermal insulation Js, Js' can be provided to delay the thermal effect caused by the air taken from the compressor exit. The thermal insulation layers Js, Js' may be made from a ceramic material.

The state of the art will become apparent from German Pat. No. 859,089 and from U.S. Pat. No. 3,583,824. German Pat. No. 859,089 teaches dividing a wear ring facing the turbine rotor blade tips into segments, and arranging these segments with circumferential clearance between them. U.S. Pat. No. 3,583,824 teaches providing a wear ring adjacent to the turbine rotor blade tips with impingement cooling.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

we claim:

1. In a gas turbine engine having a rotor, a casing surrounding the rotor, a combustion chamber within the casing, and a compressor, an arrangement for maintaining minimal clearances between the radially-outermost surfaces of the turbine rotor and the turbine casing surrounding the rotor, the arrangement comprising:
   (a) an annular sleeve surrounding the turbine rotor and fixed with respect to the turbine casing, the sleeve being elastically deformable in a radial direction,
   (b) a wear ring carried by the deformable sleeve, the wear ring being composed of segments arranged end-to-end circumferentially, the adjacent ends of the segments being spaced apart when the engine is cold or idling, the spaces between the segments closing and the segment ends engaging each other within one operating range of temperatures of the engine, and the sleeve expanding radially within a higher operating range of temperatures of the engine,
   (c) duct means for conducting air from the outlet of the compressor, the deformable sleeve being mounted on the duct means and the duct means forming part of the combustion chamber of the engine, one wall of the duct means having a forked section,
   (d) an annular perforated sleeve surrounding and connected to the deformable sleeeve, air from the duct flowing through the perforations in the perforated sleeve and thereby being directed against the deformable sleeve,
   (e) means for directing air from the duct against the wear ring,
   (f) an annular deflector connected to the perforated sleeve, the deflector defining an end of the duct and being loosely retained within the forked section of the duct, and
   (g) layers of thermal insulation on the duct means and on the surface of the wear ring facing the rotor blades, the insulation being of ceramic material.

* * * * *